US009162175B2

(12) United States Patent
Sundaram (10) Patent No.: US 9,162,175 B2
(45) Date of Patent: Oct. 20, 2015

(54) APPARATUS AND SYSTEMS HAVING COMPACT CONFIGURATION MULTIPLE SWING ADSORPTION BEDS AND METHODS RELATED THERETO (75) Inventor: Narasimhan Sundaram, Annandale, NJ (US)

(73) Assignee: ExxonMobil Upstream Research Company, Houston, TX (US)

(*) Notice: Subject to any disclaimer, the term of this patent is extended or adjusted under 35 U.S.C. 154(b) by 38 days.

(21) Appl. No.: 13/976,889

(22) PCT Filed: Feb. 27, 2012

(86) PCT No.: PCT/US2012/026803
§ 371 (c)(1),
(2), (4) Date: Jun. 27, 2013

(87) PCT Pub. No.: WO2012/118760
PCT Pub. Date: Sep. 7, 2012

(65) Prior Publication Data
US 2013/0340620 A1    Dec. 26, 2013

Related U.S. Application Data (60) Provisional application No. 61/448,125, filed on Mar. 1, 2011.

(51) Int. Cl.
*B01D 53/047* (2006.01)
*B01D 53/04* (2006.01)

(52) U.S. Cl.
CPC .......... *B01D 53/0407* (2013.01); *B01D 53/047* (2013.01); *B01D 53/0446* (2013.01); *B01D 53/0462* (2013.01); *B01D 2253/108* (2013.01); *B01D 2256/245* (2013.01);

(Continued)

(58) Field of Classification Search
CPC ............. B01D 53/047; B01D 53/0407; B01D 53/0446; B01D 53/0462; B01D 2253/108; B01D 2256/245; B01D 2257/304; B01D 2257/504; Y02C 10/08; Y10T 29/49826
USPC .................................... 96/121, 139, 152, 154
See application file for complete search history.

(56) References Cited

U.S. PATENT DOCUMENTS 1,868,138 A    7/1932 Fisk
3,103,425 A    9/1963 Meyer .............................. 55/62

(Continued)

FOREIGN PATENT DOCUMENTS

CA    2 234 924    4/1998
CA    2 224 471    6/1998

(Continued)

OTHER PUBLICATIONS (2008), "Rapid Cycle Pressure Swing Adsorption (RCPSA)," QuestAir, 4 pgs.
(2008), "Rapid Cycle Pressure Swing Adsorption," ExxonMobil Research and Engineering, 2 pgs.
Conviser, (1964) "Removal of CO2 from Natural Gas With Molecular Sieves," *Publication*, pp. 1F-12F.
GE Oil & Gas (2007) "Dry Gas Seal Retrofit," Florene, Italy, www.ge.com/oilandgas.

(Continued)

*Primary Examiner* — Frank Lawrence
(74) *Attorney, Agent, or Firm* — ExxonMobil Upstream Research Company Law Department (57) ABSTRACT A compact configuration for a plurality of swing adsorption beds. The beds are configured within a single vessel such that one or more beds of adsorbent material are position as successive rings about a first, or core, bed of adsorbent material.

37 Claims, 3 Drawing Sheets (52) U.S. Cl.
CPC .... *B01D 2257/304* (2013.01); *B01D 2257/504* (2013.01); *Y02C 10/08* (2013.01); *Y10T 29/49826* (2015.01)

(56) References Cited

U.S. PATENT DOCUMENTS

| | | | |
|---|---|---|---|
| 3,124,152 A | 3/1964 | Payne | |
| 3,142,547 A | 7/1964 | Marsh et al. | |
| 3,508,758 A | 4/1970 | Strub | |
| 3,602,247 A | 8/1971 | Bunn et al. | |
| 3,788,036 A | 1/1974 | Lee et al. | |
| 3,967,464 A | 7/1976 | Cormier et al. | |
| 4,261,815 A | 4/1981 | Kelland | |
| 4,324,565 A | 4/1982 | Benkmann | |
| 4,325,565 A | 4/1982 | Winchell | |
| 4,329,162 A | 5/1982 | Pitcher, Jr. | |
| 4,340,398 A | 7/1982 | Doshi et al. | |
| 4,496,376 A | 1/1985 | Hradek | 55/163 |
| 4,698,072 A * | 10/1987 | Rohde et al. | 95/119 |
| 4,711,968 A | 12/1987 | Oswald et al. | |
| 4,737,170 A | 4/1988 | Searle | 55/179 |
| 4,783,205 A | 11/1988 | Searle | 55/161 |
| 4,784,672 A | 11/1988 | Sircar | |
| 4,790,272 A | 12/1988 | Woolenweber | |
| 4,816,039 A | 3/1989 | Krishnamurthy et al. | |
| 4,877,429 A | 10/1989 | Hunter | |
| 5,110,328 A | 5/1992 | Yokota et al. | |
| 5,125,934 A | 6/1992 | Krishnamurthy et al. | |
| 5,169,006 A | 12/1992 | Stelzer | |
| 5,174,796 A | 12/1992 | Davis et al. | |
| 5,224,350 A | 7/1993 | Mehra | |
| 5,234,472 A | 8/1993 | Krishnamurthy et al. | |
| 5,286,282 A * | 2/1994 | Goodell et al. | 96/113 |
| 5,292,990 A | 3/1994 | Kantner et al. | |
| 5,306,331 A | 4/1994 | Auvil et al. | |
| 5,338,450 A * | 8/1994 | Maurer | 210/286 |
| 5,370,728 A | 12/1994 | LaSala et al. | |
| 5,565,018 A | 10/1996 | Baksh et al. | |
| 5,672,196 A | 9/1997 | Acharya et al. | 95/97 |
| 5,700,310 A | 12/1997 | Bowman et al. | |
| 5,750,026 A | 5/1998 | Gadkaree et al. | |
| 5,792,239 A | 8/1998 | Reinhold, III et al. | |
| 5,807,423 A | 9/1998 | Lemcoff et al. | |
| 5,811,616 A | 9/1998 | Holub et al. | |
| 5,827,358 A | 10/1998 | Kulish et al. | |
| 5,906,673 A | 5/1999 | Reinhold, III et al. | |
| 5,924,307 A | 7/1999 | Nenov | |
| 5,968,234 A | 10/1999 | Midgett, II et al. | |
| 5,997,617 A | 12/1999 | Czabala et al. | |
| 6,007,606 A | 12/1999 | Baksh et al. | |
| 6,011,192 A | 1/2000 | Baker et al. | |
| 6,053,966 A | 4/2000 | Moreau et al. | |
| 6,063,161 A | 5/2000 | Keefer et al. | |
| 6,099,621 A | 8/2000 | Ho | |
| 6,129,780 A | 10/2000 | Millet et al. | |
| 6,136,222 A | 10/2000 | Friesen et al. | |
| 6,147,126 A | 11/2000 | DeGeorge et al. | |
| 6,171,371 B1 | 1/2001 | Derive et al. | |
| 6,176,897 B1 | 1/2001 | Keefer | |
| 6,179,900 B1 | 1/2001 | Behling et al. | |
| 6,210,466 B1 | 4/2001 | Whysall et al. | |
| 6,231,302 B1 | 5/2001 | Bonardi | |
| 6,245,127 B1 | 6/2001 | Kane et al. | |
| 6,284,021 B1 | 9/2001 | Lu et al. | |
| 6,311,719 B1 | 11/2001 | Hill et al. | |
| 6,345,954 B1 | 2/2002 | Al-Himyary et al. | |
| 6,398,853 B1 | 6/2002 | Keefer et al. | |
| 6,406,523 B1 | 6/2002 | Connor et al. | |
| 6,436,171 B1 | 8/2002 | Wang et al. | |
| 6,444,012 B1 | 9/2002 | Dolan et al. | |
| 6,444,014 B1 | 9/2002 | Mullhaupt et al. | |
| 6,444,523 B1 | 9/2002 | Fan et al. | |
| 6,451,095 B1 | 9/2002 | Keefer et al. | |
| 6,457,485 B2 | 10/2002 | Hill et al. | |
| 6,471,939 B1 | 10/2002 | Boix et al. | |
| 6,488,747 B1 | 12/2002 | Keefer | |
| 6,497,750 B2 | 12/2002 | Butwell et al. | |
| 6,500,241 B2 | 12/2002 | Reddy | |
| 6,500,404 B1 | 12/2002 | Camblor Fernandez et al. | |
| 6,506,351 B1 | 1/2003 | Jain et al. | |
| 6,517,609 B1 | 2/2003 | Monereau et al. | |
| 6,531,516 B2 | 3/2003 | Davis et al. | |
| 6,533,846 B1 | 3/2003 | Keefer et al. | |
| 6,565,627 B1 | 5/2003 | Golden et al. | |
| 6,565,635 B2 | 5/2003 | Keefer et al. | |
| 6,565,825 B2 | 5/2003 | Ohji et al. | |
| 6,572,678 B1 | 6/2003 | Wijmans et al. | |
| 6,579,341 B2 | 6/2003 | Baker et al. | |
| 6,593,541 B1 | 7/2003 | Herren | |
| 6,595,233 B2 | 7/2003 | Pulli | |
| 6,605,136 B1 | 8/2003 | Graham et al. | |
| 6,607,584 B2 | 8/2003 | Moreau et al. | |
| 6,630,012 B2 | 10/2003 | Wegeng et al. | |
| 6,641,645 B1 | 11/2003 | Lee et al. | |
| 6,660,065 B2 | 12/2003 | Byrd et al. | |
| 6,712,087 B2 | 3/2004 | Hill et al. | |
| 6,746,515 B2 | 6/2004 | Wegeng et al. | |
| 6,752,852 B1 | 6/2004 | Jacksier et al. | |
| 6,802,889 B2 | 10/2004 | Graham et al. | |
| 6,835,354 B2 | 12/2004 | Woods et al. | |
| 6,916,358 B2 | 7/2005 | Nakamura et al. | |
| 6,918,953 B2 | 7/2005 | Lomax, Jr. et al. | |
| 6,974,496 B2 | 12/2005 | Wegeng et al. | |
| 7,025,801 B2 | 4/2006 | Moereau | |
| 7,094,275 B2 | 8/2006 | Keefer et al. | |
| 7,117,669 B2 | 10/2006 | Kaboord et al. | |
| 7,144,016 B2 | 12/2006 | Gozdawa | |
| 7,160,356 B2 | 1/2007 | Koros et al. | |
| 7,160,367 B2 | 1/2007 | Babicki et al. | |
| 7,166,149 B2 | 1/2007 | Dunne et al. | |
| 7,189,280 B2 | 3/2007 | Alizadeh-Khiavi et al. | |
| 7,250,074 B2 | 7/2007 | Tonkovich et al. | |
| 7,276,107 B2 | 10/2007 | Baksh et al. | |
| 7,311,763 B2 | 12/2007 | Neary | |
| RE40,006 E | 1/2008 | Keefer et al. | |
| 7,314,503 B2 | 1/2008 | Landrum et al. | |
| 7,390,350 B2 | 6/2008 | Weist, Jr. et al. | |
| 7,404,846 B2 | 7/2008 | Golden et al. | |
| 7,449,049 B2 | 11/2008 | Thomas et al. | |
| 7,527,670 B2 | 5/2009 | Ackley et al. | |
| 7,578,864 B2 | 8/2009 | Watanabe et al. | |
| 7,604,682 B2 | 10/2009 | Seaton | |
| 7,637,989 B2 | 12/2009 | Bong | |
| 7,641,716 B2 | 1/2010 | Lomax, Jr. et al. | |
| 7,645,324 B2 | 1/2010 | Rode et al. | |
| 7,651,549 B2 | 1/2010 | Whitley | |
| 7,674,319 B2 | 3/2010 | Lomax, Jr. et al. | |
| 7,687,044 B2 | 3/2010 | Keefer et al. | |
| 7,713,333 B2 | 5/2010 | Rege et al. | |
| 7,722,700 B2 | 5/2010 | Sprinkle | |
| 7,731,782 B2 | 6/2010 | Kelley et al. | |
| 7,740,687 B2 | 6/2010 | Reinhold, III | |
| 7,744,676 B2 | 6/2010 | Leitmayr et al. | |
| 7,763,098 B2 | 7/2010 | Alizadeh-Khiavi et al. | |
| 7,819,948 B2 | 10/2010 | Wagner | |
| 7,858,169 B2 | 12/2010 | Yamashita | |
| 7,938,886 B2 | 5/2011 | Hershkowitz et al. | |
| 7,947,120 B2 | 5/2011 | Deckman et al. | |
| 7,959,720 B2 | 6/2011 | Deckman et al. | |
| 8,034,164 B2 | 10/2011 | Lomax, Jr. et al. | |
| 8,071,063 B2 | 12/2011 | Reyes et al. | |
| 8,142,745 B2 | 3/2012 | Reyes et al. | |
| 8,142,746 B2 | 3/2012 | Reyes et al. | |
| 8,192,709 B2 | 6/2012 | Reyes et al. | |
| 8,262,783 B2 | 9/2012 | Stoner et al. | |
| 8,268,043 B2 | 9/2012 | Celik et al. | |
| 8,272,401 B2 | 9/2012 | McLean | |
| 8,361,200 B2 | 1/2013 | Sayari et al. | |
| 8,444,750 B2 | 5/2013 | Deckman et al. | |
| 8,529,662 B2 | 9/2013 | Kelley et al. | |
| 8,529,663 B2 | 9/2013 | Reyes et al. | |
| 8,529,664 B2 | 9/2013 | Deckman et al. | |
| 8,529,665 B2 | 9/2013 | Manning et al. | |
| 8,545,602 B2 | 10/2013 | Chance et al. | |

(56) References Cited

U.S. PATENT DOCUMENTS

| | | |
|---|---|---|
| 8,591,627 B2 | 11/2013 | Jain |
| 2001/0047824 A1 | 12/2001 | Hill et al. |
| 2002/0124885 A1 | 9/2002 | Hill et al. |
| 2002/0162452 A1 | 11/2002 | Butwell et al. |
| 2003/0075485 A1 | 4/2003 | Ghijsen |
| 2003/0170527 A1 | 9/2003 | Finn et al. |
| 2003/0205130 A1 | 11/2003 | Neu et al. |
| 2003/0223856 A1 | 12/2003 | Yuri et al. |
| 2004/0099142 A1 | 5/2004 | Arquin et al. |
| 2004/0197596 A1 | 10/2004 | Connor et al. |
| 2004/0232622 A1 | 11/2004 | Gozdawa |
| 2005/0109419 A1 | 5/2005 | Ohmi et al. |
| 2005/0114032 A1 | 5/2005 | Wang |
| 2005/0129952 A1 | 6/2005 | Sawada et al. |
| 2005/0145111 A1 | 7/2005 | Keefer et al. |
| 2005/0150378 A1 | 7/2005 | Dunne et al. |
| 2005/0229782 A1 | 10/2005 | Monereau et al. |
| 2005/0252378 A1 | 11/2005 | Celik et al. |
| 2006/0048648 A1 | 3/2006 | Gibbs et al. |
| 2006/0049102 A1 | 3/2006 | Miller et al. |
| 2006/0105158 A1 | 5/2006 | Fritz et al. |
| 2006/0162556 A1 | 7/2006 | Ackley et al. |
| 2006/0165574 A1 | 7/2006 | Sayari |
| 2006/0169142 A1 | 8/2006 | Rode et al. |
| 2006/0236862 A1 | 10/2006 | Golden et al. |
| 2007/0084241 A1 | 4/2007 | Kretchmer et al. |
| 2007/0084344 A1 | 4/2007 | Moriya et al. |
| 2007/0222160 A1 | 9/2007 | Roberts-Haritonov et al. |
| 2007/0253872 A1 | 11/2007 | Keefer et al. |
| 2007/0283807 A1 | 12/2007 | Whitley |
| 2008/0051279 A1 | 2/2008 | Klett et al. |
| 2008/0072822 A1 | 3/2008 | White |
| 2008/0282883 A1 | 11/2008 | Rarig et al. |
| 2008/0282885 A1 | 11/2008 | Deckman et al. |
| 2008/0282888 A1 | 11/2008 | Deckman et al. |
| 2008/0289497 A1 | 11/2008 | Barclay et al. |
| 2008/0314244 A1 | 12/2008 | Kelley et al. |
| 2008/0314245 A1 | 12/2008 | Hershkowitz et al. |
| 2008/0314246 A1 | 12/2008 | Deckman et al. |
| 2009/0004073 A1 | 1/2009 | Gleize et al. |
| 2009/0037550 A1 | 2/2009 | Mishra et al. |
| 2009/0079870 A1 | 3/2009 | Matsui |
| 2009/0107332 A1 | 4/2009 | Wagner |
| 2009/0151559 A1 | 6/2009 | Verma et al. |
| 2009/0241771 A1 | 10/2009 | Manning et al. |
| 2009/0308248 A1 | 12/2009 | Siskin et al. |
| 2009/0314159 A1* | 12/2009 | Haggerty ............ 95/90 |
| 2010/0059701 A1 | 3/2010 | McLean |
| 2010/0077920 A1 | 4/2010 | Baksh et al. |
| 2010/0089241 A1 | 4/2010 | Stoner et al. |
| 2010/0212493 A1 | 8/2010 | Rasmussen et al. |
| 2010/0251887 A1 | 10/2010 | Jain |
| 2010/0252497 A1 | 10/2010 | Ellison et al. |
| 2010/0263534 A1 | 10/2010 | Chuang |
| 2010/0282593 A1 | 11/2010 | Speirs et al. |
| 2011/0031103 A1 | 2/2011 | Deckman et al. |
| 2011/0146494 A1 | 6/2011 | Desai et al. |
| 2011/0217218 A1 | 9/2011 | Gupta et al. |
| 2011/0277629 A1 | 11/2011 | Manning et al. |
| 2012/0006193 A1* | 1/2012 | Roychoudhury et al. ........ 95/11 |
| 2012/0024152 A1 | 2/2012 | Yamawaki et al. |
| 2012/0026797 A1 | 2/2012 | Kim |
| 2012/0026799 A1 | 2/2012 | Lee |
| 2012/0026801 A1 | 2/2012 | Lee |
| 2012/0026802 A1 | 2/2012 | Confalonieri |
| 2012/0026803 A1 | 2/2012 | Lee |
| 2012/0026804 A1 | 2/2012 | Nagashina et al. |
| 2012/0031144 A1 | 2/2012 | Northrop et al. |
| 2012/0067216 A1 | 3/2012 | Corma-Canos et al. |
| 2012/0152115 A1 | 6/2012 | Gerds et al. |
| 2012/0222551 A1 | 9/2012 | Deckman |
| 2012/0222552 A1 | 9/2012 | Ravikovitch et al. |
| 2012/0222553 A1 | 9/2012 | Kamakoti et al. |
| 2012/0222554 A1 | 9/2012 | Leta et al. |
| 2012/0222555 A1 | 9/2012 | Gupta et al. |
| 2012/0255377 A1 | 10/2012 | Kamakoti et al. |
| 2012/0308456 A1 | 12/2012 | Leta et al. |
| 2012/0312163 A1 | 12/2012 | Leta et al. |
| 2013/0061755 A1 | 3/2013 | Frederick et al. |
| 2013/0225898 A1 | 8/2013 | Sundaram et al. |
| 2014/0060326 A1 | 3/2014 | Sundaram et al. |

FOREIGN PATENT DOCUMENTS

| | | |
|---|---|---|
| CA | 2 228 206 | 7/1998 |
| CA | 2 297 590 | 8/2000 |
| CA | 2 297 591 | 8/2000 |
| CA | 2 237 103 | 12/2001 |
| CA | 2 357 356 | 3/2002 |
| EP | 0257493 | 2/1988 |
| EP | 0426937 | 5/1991 |
| EP | 1 004 341 | 5/2000 |
| EP | 1004341 | 5/2000 |
| EP | 1 018 359 | 7/2000 |
| EP | 1018359 | 7/2000 |
| EP | 1413348 | 8/2002 |
| EP | 1577561 | 9/2005 |
| EP | 1 203 610 | 12/2005 |
| EP | 1203610 | 12/2005 |
| EP | 1798197 | 6/2007 |
| EP | 1045728 | 11/2009 |
| JP | 59-232174 | 12/1984 |
| JP | 2000024445 | 8/2001 |
| JP | 2002348651 | 12/2002 |
| JP | 2006016470 | 1/2006 |
| JP | 2006036849 | 2/2006 |
| WO | WO 99/43418 | 9/1999 |
| WO | WO00/35560 | 6/2000 |
| WO | WO 2002/024309 | 3/2002 |
| WO | WO2005/032694 | 4/2005 |
| WO | WO2005/070518 | 8/2005 |
| WO | WO2006/017940 | 2/2006 |
| WO | WO2006/074343 | 7/2006 |
| WO | WO 2007/111738 | 10/2007 |
| WO | WO 2010/123598 | 10/2010 |
| WO | WO 2010/130787 | 11/2010 |
| WO | WO 2011/139894 | 11/2011 |
| WO | WO2012/118755 | 9/2012 |
| WO | WO2012/118757 | 9/2012 |
| WO | WO2012/118758 | 9/2012 |
| WO | WO2012/118759 | 9/2012 |
| WO | WO2012/118760 | 9/2012 |
| WO | WO2012/161826 | 11/2012 |
| WO | WO2012/161828 | 11/2012 |
| WO | WO2013/022529 | 2/2013 |

OTHER PUBLICATIONS

Farooq, et al. (1990) "Continuous Contercurrent Flow Model for a Bulk PSA Separation Process," *AIChE J.*, v36 (2) p. 310-314.

FlowServe "Exceeding Expectations, US Navy Cuts Maintenance Costs With Flowserve GX-200 Non-Contacting Seal Retrofits," *Face-to-Face*, v17.1.

Herrmann, et al. (2008) "Curvelet-Based Seismic Data Processing: A Multiscale and Nonlinear Approach," *Geophysics*, v73.1, pp. A1-A5.

Hopper, et al. (2008) "World's First 10,000 psi Sour Gas Injection Compressor," *Proceedings of the 37th Turbomachinery Symosium*, pp. 73-95.

Reyes, et al. (1997) "Frequency Modulation Methods for Diffusion and Adsorption Measurements in Porous Solids," *J. Phys. Chem. B.* v101, pp. 614-622.

Sahni, et al. (2005) "Multiresolution Wavelet Analysis for Improved Reservoir Description," SPE-87820, *Soc. of Petroleum Eng.—Reservoir Evaluation & Engineering*, pp. 53-69 (XP-002550569).

Stahley, (2003) "Design, Operation, and Maintenance Considerations for Improved Dry Gas Seal Realiability in Centrifugal Compressors".

Suzuki, (1985) "Continuous-Countercurrent-Flow Approximation for Dynamic Steady State Profile of Pressure Swing Adsorption" *AIChE Symp. Ser.* v81 (242) pp. 67-73.

\* cited by examiner

APPARATUS AND SYSTEMS HAVING COMPACT CONFIGURATION MULTIPLE SWING ADSORPTION BEDS AND METHODS RELATED THERETO

CROSS REFERENCE TO RELATED APPLICATIONS

This application is the National Stage entry under 35 U.S.C. 371 of PCT/US2012/026803 that published as Intl. Patent Application Publication No. 2012/118760 and was filed on Feb. 27, 2012, which claims the benefit of U.S. Provisional Application No. 61/448,125, filed on Mar. 1, 2011, each of which is incorporated by reference, in its entirety, for all purposes.

This application is related to U.S. Patent Application No. 61/448,117 entitled APPARATUS AND SYSTEMS HAVING AN ENCASED ADSORBENT CONTACTOR AND SWING ADSORPTION PROCESSES RELATED THERETO, filed Mar. 1, 2011; U.S. Patent Application No. 61/448,120 entitled APPARATUS AND SYSTEMS HAVING A RECIPROCATING VALVE HEAD ASSEMBLY AND SWING ADSORPTION PROCESSES RELATED THERETO, filed Mar. 1, 2011; U.S. Patent Application No. 61/448,121 entitled METHODS OF REMOVING CONTAMINANTS FROM A HYDROCARBON STREAM BY SWING ADSORPTION AND RELATED APPARATUS AND SYSTEMS, filed Mar. 1, 2011; and U.S. Patent Application No. 61/448,123 entitled APPARATUS AND SYSTEMS HAVING A ROTARY VALVE ASSEMBLY AND SWING ADSORPTION PROCESSES RELATED THERETO, filed Mar. 1, 2011, and U.S. Patent Application No. 61/594,824 entitled METHODS OF REMOVING CONTAMINANTS FROM A HYDROCARBON STREAM BY SWING ADSORPTION AND RELATED APPARATUS AND SYSTEMS, filed Feb. 3, 2012, each of which is herein incorporated by reference in its entirety.

FIELD OF THE INVENTION

The present invention relates to a compact configuration for a plurality of swing adsorption beds. The beds are configured within a single vessel such that one or more beds of adsorbent material are positioned as successive rings about a first, or core, adsorbent bed of adsorbent material.

BACKGROUND OF THE INVENTION

Gas separation is important in many industries and can typically be accomplished by flowing a mixture of gases over an adsorbent of an adsorbent contactor that preferentially adsorbs more readily adsorbed components relative to less readily adsorbed components of the mixture. One of the more important types of gas separation technology is swing adsorption.

Conventional swing adsorption processes typically take place in a cylindrical vessel containing a plurality of adsorbent beds. Some swing adsorption processes are performed in a plurality of adsorbent beds, each within its own vessel. Such designs may be useful when gas processing requires only small diameter beds or when a large equipment footprint is available. However, such designs are generally not desirable for large scale operations that require large diameter adsorbent beds or where a small footprint is critical, such as on off-shore platforms or in arctic or desert environments. Therefore, there is a need in the art for swing adsorption apparatus that can be used for large scale gas separations and which occupy a small footprint.

SUMMARY OF THE INVENTION

In accordance with the present invention there is provided an adsorbent bed system comprising: (a) a first bed of adsorbent material capable of selectively removing a target gas from a gaseous mixture, which adsorbent bed is substantially cylindrical shape; and (b) a second bed of adsorbent material capable of selectively removing a target gas from a gaseous mixture, which second adsorbent bed has a substantially cylindrical shape and being disposed about the first bed of adsorbent material and is substantially the same cross-sectional area as the cross-sectional area of the first adsorbent bed.

In a preferred embodiment, a third bed of adsorbent bed material capable of selectively removing a target gas from a gaseous mixture and being substantially annular in shape and being disposed about the second bed of adsorbent material, the third bed of adsorbent material having approximately the same cross-sectional area as the cross-sectional area of the first and second beds of adsorbent material.

In another preferred embodiment, a fourth bed of adsorbent material which has selectivity to a target gas in a gaseous mixture and having a substantially cylindrical shape and being disposed about the third bed of adsorbent material, the fourth bed of adsorbent material having approximately the same cross-sectional area as the cross-sectional area of the first, second and third beds of adsorbent material.

DETAILED DESCRIPTION OF THE INVENTION

Unless otherwise explained, all technical and scientific terms used herein have the same meaning as commonly understood by one of ordinary skill in the art to which this disclosure pertains. The singular terms "a," "an," and "the" include plural referents unless the context clearly indicates otherwise. Similarly, the word "or" is intended to include "and" unless the context clearly indicates otherwise. The term "includes" means "comprises." All patents and publications mentioned herein are incorporated by reference in their entirety, unless otherwise indicated. In case of conflict as to the meaning of a term or phrase, the present specification, including explanations of terms, will control. Directional terms, such as "upper," "lower," "top," "bottom," "front," "back," "vertical," and "horizontal," are used herein to express and clarify the relationship between various elements. It should be understood that such terms do not denote absolute orientation (e.g., a "vertical" component can become horizontal by rotating the device). The materials, methods, and examples recited herein are illustrative only and not intended to be limiting.

Other applications in the technical area include U.S. Patent Application Nos. 61/447,806, 61/447,812, 61/447,824, 61/447,848, 61/447,869, 61/447,835, and 61/447,877, each of which is herein incorporated by reference in its entirety.

The present invention relates to compact configurations for swing adsorption equipment suitable for use at remote locations where space is at a premium. For example, there is a great need for compact equipment designs for equipment used on off-shore platforms. Any swing adsorption equipment used off-shore should fit within a defined compact space allotted to it on the platform. The only conventional swing adsorption systems that can presently be used off-shore are systems containing only a few relatively small adsorbent beds capable of processing only a relatively small volume of feed gas. Consequently, large volumes of gases to be separated typically cannot be performed off-shore. The present invention allows for smaller swing adsorption equipment sizes, but without any appreciable sacrifice to performance capacity when compared to conventional swing adsorption equipment of comparable performance capacity. The present invention incorporates a compact design for multiple adsorbent beds that can be encased in a single vessel to form the adsorbent bed unit, each bed sharing a common actuator system with the other beds of the vessel. All vessel walls in the concentric arrangements are preferably of suitable thickness to withstand pressures in the range of 100 bar to 200 bar. The vessel walls are preferably multi-layered to facilitate drop-in or change-out of adsorbent beds, as well as for increasing durability for cyclic pressure swing conditions. These wall may be cylindrically shapped or other suitable geometric shapes. The vessels walls can also be suitably corrugated or stiffened in sections by any conventional means known in art.

Non-limiting swing adsorption processes include pressure swing adsorption (PSA), vacuum pressure swing adsorption (VPSA), temperature swing adsorption (TSA), partial pressure swing adsorption (PPSA), rapid cycle pressure swing adsorption (RCPSA), rapid cycle thermal swing adsorption (RCTSA), rapid cycle partial pressure swing adsorption (RCPPSA), as well as combinations of these processes such as pressure/temperature swing adsorption.

PSA processes rely on the phenomenon of gases being more readily adsorbed within the pore structure or free volume of an adsorbent material when the gas is under pressure, i.e., the higher the gas pressure, the greater the amount readily-adsorbed gas adsorbed. When the pressure is reduced, the adsorbed component is released, or desorbed. Accordingly, the process may include one or more of these steps to separate certain gases from a stream.

PSA processes may be used to separate gases of a gas mixture because different gases tend to fill the micropore of the adsorbent to different extents. If a gas mixture, such as natural gas, is passed under pressure through a vessel containing a polymeric or microporous adsorbent that is more selective towards carbon dioxide than it is for methane, at least a portion of the carbon dioxide is selectively adsorbed by the adsorbent, and the gas exiting the vessel is enriched in methane. When the adsorbent reaches the end of its capacity to adsorb carbon dioxide, it is regenerated by reducing the pressure, thereby releasing the adsorbed carbon dioxide. The adsorbent is then typically purged and repressurized and ready for another adsorption cycle.

TSA processes rely on the phenomenon that gases at lower temperatures are more readily adsorbed within the pore structure or free volume of an adsorbent material compared to higher temperatures, i.e., when the temperature of the adsorbent is increased, the adsorbed gas is released, or desorbed. By cyclically swinging the temperature of an adsorbent bed, TSA processes can be used to separate gases in a mixture when used with an adsorbent that is selective for one or more of the components of a gas mixture.

Swing adsorption processes typically take place in a vessel containing one or more adsorbent beds. In multi-bed systems, each adsorbent bed may undergo a different step in an adsorption cycle, such as an adsorption step, one or more depressurization/desorption steps, one or more blow-down steps, and one or more repressurization steps. The flow of fluid to and from each bed is typically controlled by either a poppet valve and/or a rotary valve assembly.

Any suitable adsorbent bed material that can be used for the separation of a target gas from a gaseous mixture can be used for the adsorbent bed system of the present invention. The adsorbent is typically comprised of an adsorbent material supported on a non-adsorbent support, or contactor. Non-limiting examples of the form of the adsorbent bed of the present invention include beds of: beaded or pelletized adsorbent particles; an adsorbent material on a structured contactor, such as a parallel channel contactor. Preferred structured contactors may contain substantially parallel flow channels wherein 20 volume percent, preferably 15 volume percent or less of the open pore volume of the contactor, excluding the flow channels, is in pores greater than about 20 angstroms. Flow channels, as used herein, means that portion of the contactor in which gas flows when a steady state pressure difference is applied between the point, or place, at which a feed stream enters the contactor and the point, or place, at which a product stream leaves the contactor. In a parallel channel contactor, the adsorbent is typically incorporated into or onto the wall of the flow channel. Non-limiting examples of geometric shapes of parallel channel contactors include various shaped monoliths having a plurality of substantially parallel channels extending from one end of the monolith to the other; a plurality of tubular members, stacked layers of adsorbent sheets with and without spacers between each sheet; multi-layered spiral rolls, spiral wound adsorbent sheets, bundles of hollow fibers, as well as bundles of substantially parallel solid fibers. "Parallel channel contactors" are defined as a subset of adsorbent contactors comprising structured (engineered) adsorbents in which substantially parallel flow channels are incorporated into the adsorbent structure. Parallel flow channels are described in detail in United States Patent Applications US 2008/0282892 and US 2008/0282886, both of which are herein incorporated by reference in their entirety. These flow channels may be formed by a variety of means and in addition to the adsorbent material, the adsorbent structure can contain items such as, but not limited to, support materials, heat sink materials, void reduction components, and heating/cooling passages.

In preferred embodiments, adsorbent materials that can be used include high surface area (>10 meters squared per gram ($m^2$/gm) and preferably >75 $m^2$/gm) alumina, microporous zeolites (preferably zeolites with particle sizes <1 millimeter (mm)), other microporous materials, mesoporous materials and ordered mesoporous materials. Non-limiting examples of these materials include carbons, cationic zeolites, high silica zeolites, highly siliceous ordered mesoporous materials, sol gel materials, ALPO materials (microporous and mesoporous materials containing predominantly aluminum phosphorous and oxygen), SAPO materials (microporous and mesoporous materials containing predominantly silicon aluminum phosphorous and oxygen), MOF materials microporous and mesoporous materials comprised of a metal organic framework) and ZIF materials (microporous and mesoporous materials comprised of zeolitic imidazolate frameworks). Other materials include microporous and mesoporous sorbents functionalized with functional groups. Examples of functional groups include primary, secondary, tertiary and other non protogenic basic groups such as amidines, guanidines and biguanides.

Figure 1:
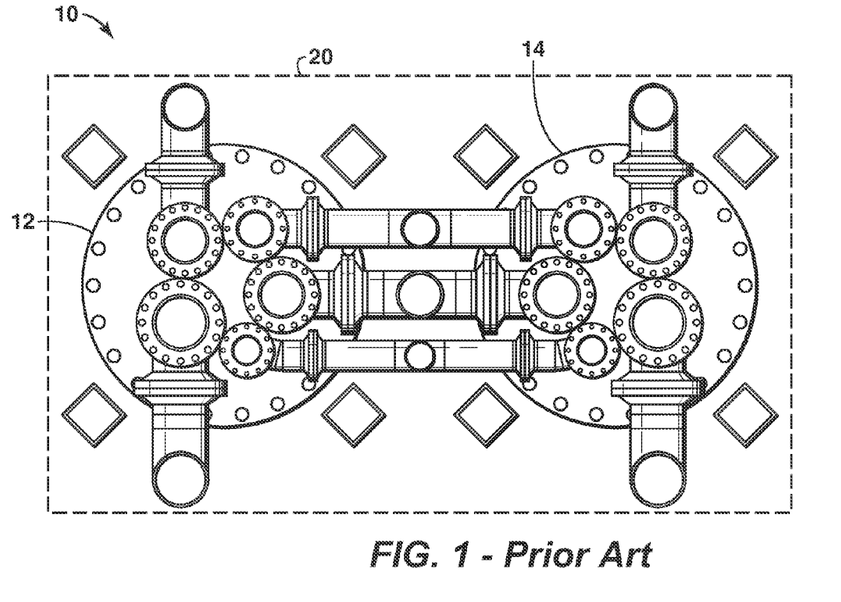
FIG. 1 hereof is a plan view representation of a conventional two adsorbent bed pressure swing adsorption apparatus showing two vessels, one for each adsorbent bed, which is typical in the art.
Figure 2:
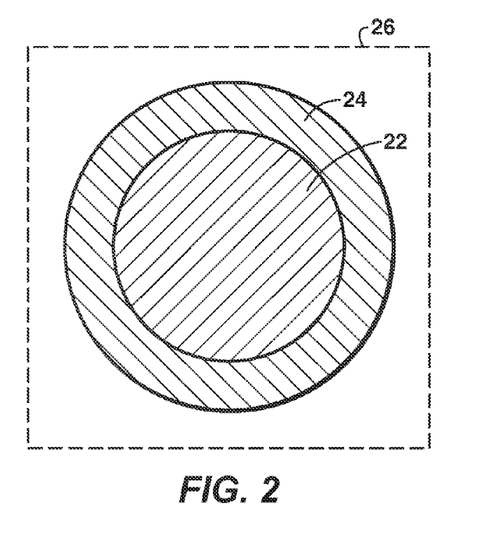
FIG. 2 hereof is a cross-sectional view taken along a horizontal plane in a single adsorption vessel of the present invention containing two beds of adsorbent material with a first bed comprising the core and a second bed is positioned annular about the first bed.

The present invention can be better understood with reference to the figures hereof FIG. 1 hereof is plan representation of conventional two adsorbent bed swing adsorption equipment 10 showing the need for two separate adsorption vessels 12, 14. Each vessel contains an adsorbent bed of adsorbent material. Each vessel 12, 14 requires its own actuator assembly and fluid communication conduits A, D, E between vessels. Also shown bordering this figure is a footprint 20 of the space such a conventional system requires. In contrast to this conventional two adsorbent bed system is the adsorbent bed structure of the present invention shown in FIG. 2 hereof FIG. 2 shows a first bed 22 at the core of a vessel with a second bed 24 forming a ring about the first adsorbent bed 22 (e.g., may be annularly positioned). The border of FIG. 2 also shows a footprint 26 for this two adsorbent bed system, which footprint 26 is about 40% less than the footprint 20 required for the conventional two adsorbent bed system shown in FIG. 1. The second adsorbent bed 24, which may have the same adsorbent material as the first bed 22, has the same face cross-sectional area of first bed 22. Therefore, second bed 24 has the same capacities/production (for the same cycle and flow rates) as first bed 22. The first adsorbent bed 22 and the second adsorbent bed 24 may be separated by a material that is non-permeable to the gas flowing through the adsorbent beds. This prevents the leakage of gas from one adsorbent bed to the other.

Figure 3:
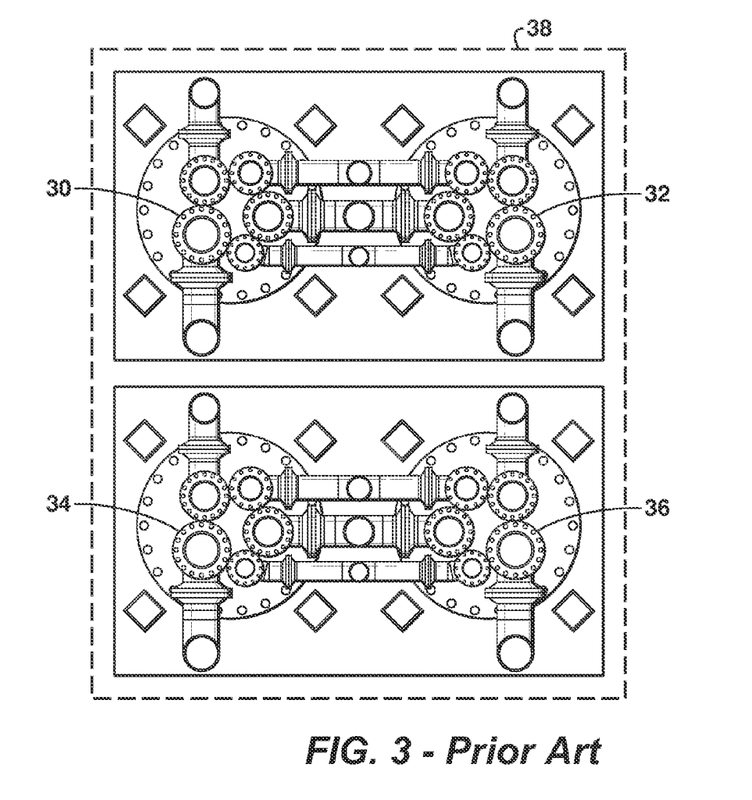
FIG. 3 hereof is a plan view representation of a conventional four adsorbent bed pressure swing adsorption apparatus showing four vessels, each containing a bed of adsorbent material.
Figure 4:
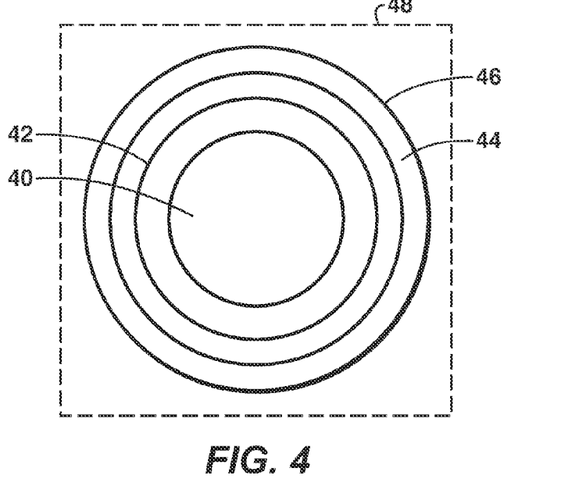
FIG. 4 hereof is a cross-sectional view taken along a horizontal plane in a single adsorption vessel of the present invention containing four beds of adsorbent material with a first bed comprising the core and the remaining three beds positioned in rings about the first bed.

FIGS. 3 and 4 are similar to FIGS. 1 and 2, but these figures compare a four bed system for conventional swing adsorption technology and that of the present invention. Referring to FIG. 3, each vessel 30, 32, 34 and 36 contains a bed of adsorbent material. Each vessel 30, 32, 34 and 36 requires its own actuator assembly and fluid communication conduits between vessels. For simplicity purposes, the entire conduit system for communication between the four vessels is not shown. Also, shown bordering this figure is a footprint 38 of the space such a conventional system requires. In contrast to this conventional four adsorbent bed, is the adsorbent bed system of the present invention shown in FIG. 4. FIG. 4 shows a first adsorbent bed 40 at the core of a vessel with a second adsorbent bed 42 forming a ring (e.g., annularly positioned) about the first adsorbent bed 40. About the second adsorbent bed 42 is a third adsorbent bed 44 annularly positioned, or forming a ring, about the second adsorbent bed 42. About the third adsorbent bed 44 is a fourth adsorbent bed 46 annularly positioned, about the third adsorbent bed 44. Each adsorbent bed may preferably be separated from the other beds by a material that is non-permeable to the gas flowing through it to prevent leakage to other adsorbent beds and to contain pressure within the respective beds. The border of FIG. 4 also shows a footprint 48 for this four adsorbent bed system, which footprint 48 is approximately 50% less than the footprint 38 required for a convention four adsorbent bed system shown in FIG. 3. The second adsorbent bed 42, the third adsorbent bed 44 and the fourth adsorbent bed 46 have substantially the same face cross-sectional area as the first adsorbent bed 40. Therefore, each of the second adsorbent bed 42, the third adsorbent bed 44 and the fourth adsorbent bed 46 have the same capacities or production (for the same cycle and flow rates) as the first adsorbent bed 40. It is noted that the drawings are not drawn to scale, and that the second adsorbent bed 42 has a larger radial dimension than the third adsorbent bed 44. Likewise, the third adsorbent bed 44 has a larger radial dimension than the fourth adsorbent bed 46. One skilled in the art readily recognizes that more than four beds can be used in accordance with the present invention. Any additional beds may have the same face cross-sectional area as the first bed 40.

Again, it can be seen that the adsorbent bed configurations of the present invention require a substantially smaller footprint than a conventional swing adsorption system comprised of the same number of adsorbent beds, each requiring its own actuator system.

Figure 5:
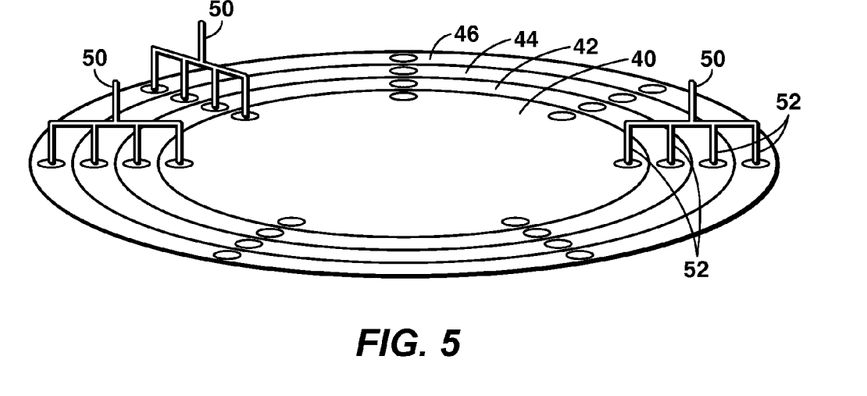
FIG. 5 hereof is a perspective representation of a cross-section taken along a horizontal plane of the four adsorbent bed system of the present invention showing how all four adsorbent beds can share a common actuator drive assembly.

FIG. 5 is a perspective representation of a cross-section of a four adsorbent bed system of the present invention. This representation shows that the size of the system may be further reduced because multiple poppet valves 52 can share the same actuator drive apparatus 50, as opposed to conventional systems that require a separate actuator drive for each adsorbent bed. It is noted that only a few drives are sketched in FIG. 5 for clarity. This feature also allows for better gas distribution since additional ports can be distributed around the annular regions.

The direction of flow of the gas streams through the different adsorbent beds may be configured to facilitate transfer of heat between the adsorbent beds. For example, the direction of gas flow in beds 1 and 3 could be opposite to the direction of gas flow in beds 2 and 4.

Practice of the present invention also has the advantages of: reduced equipment weight and complexity; more efficient manufacture and assembly of the adsorbent beds; and maintaining uniformity and identical nature of each bed, which are important to separation performance. If structured materials are used for the adsorbent beds of the present invention their assembly is facilitated by the multiple/distributed concentric shapes. For example, in spiral wound structures, each concentric shell provides the core around which the spiral winding for each bed can be initiated, but it is difficult to maintain a proper tension during spiral winding of large-diameter conventional, (non-annular) cross-section vessels. For monolithic structures as well, the processes of forming uniform structures, are greatly improved when a single structure is made, rather than when separate structures are independently made. Accordingly, by using a single block of material, the multiple vessels are assembled in-situ by suitable introduction of the successive vessels walls, taking advantage of the configuration provided by the present invention. One preferred way of assembling the multiple adsorbent bed system of the present invention is to place annular grooves into an adsorbent monolith and sliding annular rings of impermeable material into the grooves running the length of the monolith material.

Adsorptive kinetic separation processes, apparatus, and systems, as described above, are useful for development and production of hydrocarbons, such as gas and oil processing. Particularly, the provided processes, apparatus, and systems are useful for the rapid, large scale, efficient separation of a variety of target gases from gas mixtures. The provided processes, apparatus, and systems may be used to prepare natural gas products by removing contaminants and heavy hydrocarbons, i.e., hydrocarbons having at least two carbon atoms.

The provided processes, apparatus, and systems are useful for preparing gaseous feed streams for use in utilities, including separation applications such as dew point control, sweetening/detoxification, corrosion protection/control, dehydration, heating value, conditioning, and purification. Examples of utilities that utilize one or more separation applications include generation of fuel gas, seal gas, non-potable water, blanket gas, instrument and control gas, refrigerant, inert gas, and hydrocarbon recovery. Exemplary "not to exceed" product (or "target") gas specifications include: (a) 2 volume percent (vol. %) $CO_2$, 4 parts per million (ppm) $H_2S$, (b) 50 ppm $CO_2$, 4 ppm $H_2S$, or (c) 1.5 vol. % $CO_2$, 2 ppm $H_2S$.

The provided processes, apparatus, and systems may be used to remove acid gas from hydrocarbon streams. Acid gas removal technology becomes increasingly important as remaining gas reserves exhibit higher concentrations of acid gas, i.e., sour gas resources. Hydrocarbon feed streams vary widely in amount of acid gas, such as from several parts per million acid gas to 90 vol. % acid gas. Non-limiting examples of acid gas concentrations from exemplary gas reserves include concentrations of at least: (a) 1 vol. % $H_2S$, 5 vol. % $CO_2$, (b) 1 vol. % $H_2S$, 15 vol. % $CO_2$, (c) 1 vol. % $H_2S$, 60 vol. % $CO_2$, (d) 15 vol. % $H_2S$, 15 vol. % $CO_2$, and (e) 15 vol. % $H_2S$, 30 vol. % $CO_2$.

One or more of the following Concepts A-O may be utilized with the processes, apparatus, and systems, provided above, to prepare a desirable product stream while maintaining high hydrocarbon recovery:

Concept A: using one or more kinetic swing adsorption process, such as pressure swing adsorption (PSA), thermal swing adsorption (TSA), calcination, and partial pressure swing or displacement purge adsorption (PPSA), including combinations of these processes; each swing adsorption process may be utilized with rapid cycles, such as using one or more rapid cycle pressure swing adsorption (RC-PSA) units, with one or more rapid cycle temperature swing adsorption (RC-TSA) units or with one or more rapid cycle partial pressure swing adsorption (RC-PPSA) units; exemplary kinetic swing adsorption processes are described in U.S. Patent Application Publication Nos. 2008/0282892, 2008/0282887, 2008/0282886, 2008/0282885, and 2008/0282884 which are each herein incorporated by reference in its entirety;

Concept B: removing acid gas with RC-TSA using advanced cycles and purges as described in U.S. patent application No. 61/447,848, filed Mar. 1, 2011, which is herein incorporated by reference in its entirety;

Concept C: using a mesopore filler to reduce the amount of trapped methane in the adsorbent and increase the overall hydrocarbon recovery, as described in U.S. Patent Application Publication Nos. 2008/0282892, 2008/0282885, 2008/028286, each of which is herein incorporated by reference in its entirety. The non-sweepable void space present within the adsorbent channel wall is can be defined by the total volume occupied by mesopores and macropores. Mesopores are defined by the IUPAC to be pores with sizes in the 20 to 500 angstrom size range. Macropores are defined herein to be pores with sizes greater than 500 angstrom and less than 1 micron. Because the flow channels are larger than 1 micron in size, they are not considered to be part of the macropore volume. The non-sweepable void space is defined herein as the open pore volume occupied by pores in the absorbent that are between 20 angstroms and 10,000 angstroms (1 micron) in diameter divided by the total volume of the contactor that is occupied by the absorbent material including associated mesopores and macropores in the absorbent structure. The non-sweepable void space can be reduced by filling the mesopores and macropores between the particles to reduce the open volume while allowing rapid gas transport throughout the adsorbent layer. This filling of the non-sweepable void, which may be referred to as mesopore filling, space is desired to reduce to acceptable levels the quantity of desired product, lost during the rapid desorption step as well as to allow a high degree of adsorbent bed purity following desorption. Such mesopore filling can be accomplished in a variety of ways. For example, a polymer filler can be used with rapid diffusion of $H_2S$ and $CO_2$, such as a silicon rubber or a polymer with intrinsic porosity. Alternatively, a pyrolitic carbon having mesoporosity and/or microporosity could be used to fill the void space. Still another way may be by filling the void space with inert solids of smaller sizes, or by filling the void space with a replenishable liquid through which the desired gases rapidly diffuse (such as water, solvents, or oil). Preferably, the void space within the adsorbent wall may be reduced to less than 40 volume percent (vol. %), preferably to less than 30 vol. %, and more preferably to less than 20 vol. %, and even more preferably to less than 10 vol. % and most preferably less than about 5 vol. % of the open pore volume;

Concept D: Choosing an appropriate adsorbent materials to provide high selectivity and minimize adsorption (and losses) of methane and other hydrocarbons, such as one or more of the zeolites described in U.S. Patent Application Publication Nos. 2008/0282887 and 2009/0211441, each of which is herein incorporated by reference in its entirety.

Preferred adsorbents for the removal of acid gases are selected from a group consisting of mesoporous or microporous materials, with or without functionality for chemical reactions with acid gases. Examples of materials without functionality include cationic zeolites and stannosilicates. Functionalized materials that chemically react with $H_2S$ and $CO_2$ exhibit significantly increased selectivity for $H_2S$ and $CO_2$ over hydrocarbons. Furthermore, they do not catalyze undesirable reactions with hydrocarbons that occur on acidic zeolites. Functionalized mesoporous adsorbents are also preferred, wherein their affinity toward hydrocarbons is further reduced compared to unfunctionalized smaller pore materials, such as zeolites.

Alternatively, adsorption of heavy hydrocarbons can be kinetically suppressed by using small-pore functionalized materials, in which diffusion of heavy hydrocarbons is slow compared to $H_2S$ and $CO_2$. Care should also be taken to reduce condensation of hydrocarbons with carbon contents equal to or above about 4 (i.e., $C_4+$ hydrocarbons) on external surfaces of $H_2S$ and $CO_2$ selective adsorbents.

Non-limiting example of functional groups suitable for use herein include primary, secondary, tertiary and other non-protogenic, basic groups such as amidines, guanidines and biguanides. Furthermore, these materials can be functionalized with two or more types of functional groups. To obtain substantially complete removal of $H_2S$ and $CO_2$ from natural gas streams, an adsorbent material preferably is selective for $H_2S$ and $CO_2$ but has a low capacity for both methane and heavier hydrocarbons ($C_2+$). In one or more embodiments, it is preferred to use amines, supported on silica based or other supports because they have strong adsorption isotherms for acid gas species. They also have high capacities for such species, and as a consequence of their high heats of adsorption, they have a relatively strong temperature response (i.e. when sufficiently heated they readily desorb $H_2S$ and $CO_2$ and can thus be used without excessive temperature swings).

Preferred are adsorbents that adsorb in the 25° C. to 70° C. range and desorb in the 90° C. to 140° C. range. In systems requiring different adsorbents for $CO_2$ and $H_2S$ removal, a layered bed comprising a suitable adsorbent for the targeted species may be desirable.

For $CO_2$ removal from natural gas, it is preferred to formulate the adsorbent with a specific class of 8-ring zeolite materials that has a kinetic selectivity. The kinetic selectivity of this class of 8-ring zeolite materials allows $CO_2$ to be rapidly transmitted into zeolite crystals while hindering the transport of methane so that it is possible to selectively separate $CO_2$ from a mixture of $CO_2$ and methane. For the removal of $CO_2$ from natural gas, this specific class of 8-ring zeolite materials preferably has a Si/Al ratio from about 1 to about 25. In other preferred embodiments, the Si/Al ratio of the zeolite material is from 2 to about 1000, preferably from about 10 to about 500, and more preferably from about 50 to about 300. It should be noted that as used herein, the term Si/Al is defined as the molar ratio of silica to alumina of the zeolitic structure. This preferred class of 8-ring zeolites that are suitable for use herein allow $CO_2$ to access the internal pore structure through 8-ring windows in a manner such that the ratio of single component diffusion coefficients for $CO_2$ over methane (i.e., $DCO_2/DCH_4$) is greater than 10, preferably greater than about 50, more preferably greater than about 100 and even more preferably greater than 200.

In many instances, nitrogen also has to be removed from natural gas or gas associated with the production of oil to obtain high recovery of a purified methane product from nitrogen containing gas. There have been very few molecular sieve sorbents with significant equilibrium or kinetic selectivity for nitrogen separation from methane. For $N_2$ separation from natural gas it is also preferred to formulate the adsorbent with a class of 8-ring zeolite materials that has a kinetic selectivity. The kinetic selectivity of this class of 8-ring materials allows $N_2$ to be rapidly transmitted into zeolite crystals while hindering the transport of methane so that it is possible to selectively separate $N_2$ from a mixture of $N_2$ and methane. For the removal of $N_2$, from natural gas, this specific class of 8-ring zeolite materials also has a Si/Al ratio from about 2 to about 1000, preferably from about 10 to about 500, and more preferably from about 50 to about 300. This preferred class of 8-ring zeolites that are suitable for use herein allow $N_2$ to access the internal pore structure through 8-ring windows in a manner such that the ratio of single component diffusion coefficients for $N_2$ over methane (i.e., $DN_2/DCH_4$) is greater than 5, preferably greater than about 20, and more preferably greater than about 50 and even more preferably greater than 100. Resistance to fouling in swing adsorption processes during the removal $N_2$ from natural gas is another advantage offered by this class of 8-ring zeolite materials.

In a preferred embodiment, $H_2S$ is selectively removed with a non-aqueous sorbent comprising a basic non-protogenic nitrogenous compound supported on a marcroporous, mesoporous, or microporous solid. The non-protogenic nitrogenous compound selectively reacts with at least a portion of the $H_2S$ in the feed gas mixture. Examples of suitable porous solid supports include activated charcoal or solid oxides (including mixed oxides), such as alumina, silica, silica-alumina or acidic or non-acidic zeolites. The basic non-protogenic nitrogenous compound may simply be physically sorbed on the support material (e.g. by impregnation or bonded with or grafted onto it by chemical reaction with the base itself or a precursor or derivative in which a substituent group provides the site for reaction with the support material in order to anchor the sorbent species onto the support).

Bonding is not, however, required for an effective solid phase sorbent material. Support materials which contain reactive surface groups, such as the silanol groups found on zeolites and the M41S silica oxides are capable of reacting with siloxane groups in compounds, such as trimethoxysilylpropyldimethylamine Non-protogenic nitrogenous compounds do not enter into chemisorption reactions with $CO_2$ in the absence of water although they do undergo reaction with $H_2S$. This differential chemical reactivity is used to make the separation between the $H_2S$ and the $CO_2$. A wide variety of basic nitrogen-containing compounds may be used as the essential sorbent. If desired, a combination of such compounds may be used. The requirement for the desired selectivity for $H_2S$ adsorption is that the nitrogenous groups be non-protogenic, that is, incapable of acting as a proton donor. The nitrogenous groups therefore do not contain an acidic, dissociable hydrogen atom, such as nitrogen in a primary or secondary amine. It is not required that the whole compound be aprotic, only that the nitrogen-containing groups in the compound be non-protogenic. Non-protogenic nitrogen species cannot donate an $H^+$ (proton), which is a prerequisite for the formation of carbamates as a route for the $CO_2$ chemisorption reaction in the absence of water; they are non-nucleophilic under the prevailing reaction conditions. Suitable nitrogenous compounds include tertiary amines such as triethylamine, triethanolamine (TEA), methyldiethanolamine (MDEA), N-methyl diethanolamine ($CH_3N(C_2H_4OH)_2$), NNN'N'-tetrakis (2-hydroxyethyl)ethylenediamine as well as non-protogenic nitrogenous bases with cyclic, multicyclic, and acyclic structures, such as imines, heterocyclic imines and amines, amidines (carboxamidines) such as dimethylamidine, guanidines, triazabicyclodecenes, imidazolines, and pyrimidines. Compounds such as the N,N-di(lower alkyl)carboxamidines where lower alkyl is preferably $C_1$-$C_6$ alkyl, N-methyltetrahydropyrimidine (MTHP), 1,8-diazabicyclo[5.4.0]-undece-7-ene (DBU), 1,5,7p-triazabicyclo[4.4.0]dec-5-ene (TBD), 7-methyl-1,5,7-triazabicyclo[4.4.0]dec-5-ene (MTBD), 1,5-diazabicyclo[4.3.0]non-5-ene (DBN), substituted guanidines of the formula $(R^1R^2N)(R^3R^4N)C=N-R^5$ where $R^1$, $R^2$, $R^3$ and $R^4$ are preferably lower alkyl ($C_1$-$C_6$) and $R^5$ is preferably H or lower alkyl ($C_1$-$C_6$), such as 1,1,3,3-tetramethylguanidine and biguanide, may also be used. Other substituent groups on these compounds such as higher alkyl, cycloalkyl, aryl, alkenyl, and substituted alkyl and other structures may also be used.

Another class of materials that is capable of removing $H_2S$ and $CO_2$, from natural gas streams is cationic zeolites. Selectivity of these materials for $H_2S$ and $CO_2$ depends on the framework structure, choice of cation, and the Si/Al ratio. In a preferred embodiment the Si/Al ratio for cationic materials is in a range from 1 to 50 and more preferably a range from 1 to 10. Examples of cationic zeolite include zeolites, 4A, 5A and faujasites (Y and X). It is preferred to use these materials for selectively removing $H_2S$ and $CO_2$ after the feed stream has been dehydrated.

Other non-limiting examples of preferred selective adsorbent materials for use in embodiments herein include microporous materials such as zeolites, AlPOs, SAPOs, MOFs (metal organic frameworks), ZIFs (zeolitic imidazolate frameworks, such as ZIF-7, ZIF-8, ZIF-22, etc.) and carbons, as well as mesoporous materials such as the amine functionalized MCM materials. For the acidic gases such as hydrogen sulfide and carbon dioxide which are typically found in natural gas streams, adsorbent such as cationic zeolites, amine-functionalized mesoporous materials, stannosilicates, carbons are also preferred;

Concept E: depressurizing one or more RC-PSA units in multiple steps to intermediate pressures so that the acid gas exhaust can be captured at a higher average pressure, thereby decreasing the compression required for acid gas injection. Pressure levels for the intermediate depressurization steps may be matched to the interstage pressures of the acid gas compressor(s) to optimize the overall compression system;

Concept F: using exhaust or recycle streams to minimize processing and hydrocarbon losses, such as using exhaust streams from one or more RC-PSA units as fuel gas instead of re-injecting or venting;

Concept G: using multiple adsorbent materials in a single bed to remove trace amounts of a first contaminant, such as $H_2S$, before removal of a second contaminant, such as $CO_2$; such segmented beds may provide rigorous acid gas removal down to ppm levels with RC-PSA units with minimal purge flow rates;

Concept H: using feed compression before one or more RC-PSA units to achieve a desired product purity;

Concept I: contemporaneous removal of non-acid gas contaminants such as mercaptans, COS, and BTEX; selection processes and materials to accomplish the same;

Concept J: using structured adsorbents for gas-solid contactors to minimize pressure drop compared to conventional packed beds;

Concept K: selecting a cycle time and cycle steps based on adsorbent material kinetics;

Concept L: using a process and apparatus that uses, among other equipment, two RC-PSA units in series, wherein the first RC-PSA unit cleans a feed stream down to a desired product purity and the second RC-PSA unit cleans the exhaust from the first unit to capture methane and maintain high hydrocarbon recovery; use of this series design may reduce the need for a mesopore filler;

Concept M: using parallel channel contactors, wherein gas/solid contacting takes place in relatively small diameter adsorbent lined channels. This structure of the contactor provides the benefits of rapid adsorption kinetics through minimization of gas film resistance and high gas solid communication. A preferred adsorber design generates a sharp adsorption front.

It is preferred to have very rapid gas to adsorbent kinetics, i.e. the length through which the target species (e.g., target gas) diffuses to make contact with the adsorbent wall is kept short, preferably less than 1000 microns, more preferably less than 200 microns, and most preferably less than 100 microns. Favorable adsorbent kinetics may be realized by, while limiting bed pressure drop to acceptable values, utilizing parallel channel contactors wherein the feed and purge gases are confined to a plurality of very narrow (1000 to 30 micron diameter) open channels that are lined to an effective thickness of the adsorbent material.

By "effective thicknesses", we mean a range of about 500 microns to 5 microns for most applications. In the most limiting case of laminar gas flow, the very narrow channels limit the maximum diffusion distance for a trace species to no more than ½ the diameter of the channel. Even when adsorbing the desired species at the leading edge of the adsorption front, where their concentrations approach zero in the gas phase, a sharp adsorption front can be maintained by using such small diameter parallel channel structured adsorption bed configurations. Such a configuration can be in the form of multiple independent parallel channels, or in the form of very wide, very short channels as may be achieved by using a spiral wound design.

Concept N: A means for rapidly heating and cooling the adsorbent bed structure so that adsorption can occur at a lower temperature and desorption at a higher temperature. The adsorption step then occurs at high pressure and the higher temperature desorption step can optionally take place at a reduced pressure in order to increase adsorbent swing capacity. Depending upon adsorbent properties, it may be desirable to use a bed architecture suitable for either an externally temperature controlled or internally temperature controlled scheme.

By "internal temperature control", we mean the use of a heating and cooling fluid media, either gaseous or liquid, preferably liquid, that can be circulated through the same adsorbent lined channels that are utilized for the gaseous feed flow. Internal temperature control requires that the adsorbent material not be adversely affected by the temperature control fluid and that the temperature control fluid be easily separated from the previously adsorbed species ($H_2S$ and $CO_2$) following the heating step. Further, for internal temperature control, the pressure drop across each of the parallel channels in the structured bed during the gaseous feed adsorption step is preferably sufficiently high to clear each channel (or the single channel in the case of spiral wound designs) of the temperature control fluid. Additionally, internal fluid flow temperature designs preferably utilizes an adsorbent that does not strongly adsorb the temperature control fluid so that $H_2S$ and $CO_2$ may be usefully adsorbed even in the presence of the temperature control fluid.

Non-limiting examples of such adsorbents include amine functionalized microporous and mesoporous adsorbents. A non-limiting example of such a system may be the use of supported amines on a water stable support with the use of hot and cold water (pressurized liquid or used as steam for heating) for heating and cooling. Whereas liquid water is left within the adsorbent wall during the adsorption step, if the thickness of the adsorbent wall is kept small (less than 1000 microns, preferably less than 200 microns, and most preferably less than 100 microns) it may be possible for $H_2S$ and $CO_2$ to diffuse through the liquid water in time scales less than 1 minute, more preferred less than 10 seconds to become adsorbed by the supported amine Following the desorption step, $H_2S$ and $CO_2$ can be easily separated using distillation or other methods known to those skilled in the art.

By "external temperature control" we mean an adsorbent bed structure where the heating and cooling fluid is kept from contact with the gas carrying adsorbent channels. Such a structure can resemble a tube and shell heat exchanger, plate and frame heat exchanger or hollow fibers with a fluid impermeable barrier layer on the outer diameter or on the inner diameter, or any other suitable structures. In order to obtain rapid heating and cooling, the distance through which the heat diffuses from the temperature control fluid to the adsorbent layer should be kept to a minimum, ideally less than 10,000 microns, more preferably less than 1000 microns, most preferably less than 200 microns.

A non-limiting example of such an external temperature control bed design may be the use of hollow fibers with a fluid impermeable barrier layer on the outer diameter wherein the hollow fibers are comprised of a mixed matrix system of polymeric and supported amine adsorbents. Feed gas is passed through the inner diameter of the porous fiber to be adsorbed by the adsorbent at lower temperatures, while cool temperature control fluid is flowing over the fibers outer diameters. Desorption may be accomplished by passing hot temperature control fluid, preferably in a counter-current direction over the fibers outer diameter, thus heating the adsorbent. The cycle is completed by exchanging the hot temperature control fluid with cold fluid to return the fiber containing the adsorbent to the desired adsorption temperature.

In a preferred embodiment, the rate of heat flow in the system may be such that a sharp temperature gradient in the temperature control fluid may be established during heating and cooling such that the sensible heat of the system can be recuperated within the adsorbent bed structure. For such a non-limiting hollow fiber example, the useful fiber outer diameter dimension is less than 20,000 microns, preferably less than 2000 microns, and most preferably less than 1000 microns. The useful hollow fiber inner diameters (the feed gas channels) is less than 10,000 microns, preferably less than 1000 microns, and most preferably less than 500 microns as suitable based on the desired adsorption and desorption cycle times, feed adsorbed species concentrations, and adsorbent layer swing capacity for those species.

In one or more embodiments, it is advantageous to keep the ratio of non-adsorbing thermal mass in the adsorbent bed to adsorbent as low as possible. This ratio may preferably be less than 20, more preferably less than 10, and most preferred less than 5. In this manner, the sensible heat of the system that must be swung in each cycle may be kept to a minimum.

Concept O: A relatively low flow of about 0.01 to 5% of the total feed of a clean gas substantially free of $H_2S$ or $CO_2$ is utilized as a purge gas. Non-limiting examples of such gases (i.e., "clean gas") include methane and nitrogen that are maintained flowing through the parallel channels in a direction counter-current to the feed direction during at least a portion of the desorption steps of the process. It is preferred that the flow rate of this clean gas be sufficient to overcome the natural diffusion of the desorbing $H_2S$ and $CO_2$ to maintain the product end of the adsorbing channel in a substantially clean condition. That is, the purge stream should have sufficient flow rate to sweep the desorbing $CO_2$ and $H_2S$ from the channels and/or pores. It is this counter-current purge flow during desorption that ensures that on each subsequent adsorption cycle there may be no bleed-through of target species, such as $H_2S$ or $CO_2$ into the product stream. A further benefit or objective of the clean purge is to assist in desorption of contaminants by reducing the partial pressure of contaminants in the flow channels of the adsorbent bed. This lessening of the partial pressure may be utilized to drive the contaminants from the adsorbent bed.

A preferred cycle and bed design for the practice of the present invention is that the product end of the adsorbent channels, i.e. the end opposite the end where feed gases enter) have a low, or ideally essentially zero concentration of adsorbed $H_2S$ and $CO_2$. In this manner, and with suitable structured channels as described above, the $H_2S$ and $CO_2$ may be rigorously removed from the feed gas stream. The downstream end of the bed can be kept clean as described by maintaining a low flow of a clean fluid substantially free of $H_2S$ and $CO_2$, in a counter-current direction relative to the feed direction, during the desorption step(s), or more preferably, during all the heating and cooling steps in the cycle. It is further preferred that during the adsorption step, the adsorption part of the cycle be limited to a time such that the advancing adsorption front of $H_2S$ and $CO_2$ loaded adsorbent not reach the end of the channels, i.e. adsorption to be halted prior to $H_2S$ and/or $CO_2$ breakthrough so that a substantially clean section of the adsorbent channel remains substantially free of target species. With reasonably sharp adsorption fronts, this may allow more than 50 vol. % of the adsorbent to be utilized, more preferred more than 75 vol. %, and most preferred more than 85 vol. %.

The processes, apparatus, and systems provided herein are useful in large gas treating facilities, such as facilities that process more than five million standard cubic feet per day (MSCFD) of natural gas, or more than 15 MSCFD of natural gas, or more than 25 MSCFD of natural gas, or more than 50 MSCFD of natural gas, or more than 100 MSCFD of natural gas, or more than 500 MSCFD of natural gas, or more than one billion standard cubic feet per day (BSCFD) of natural gas, or more than two BSCFD of natural gas.

Compared to conventional technology, the provided processes, apparatus, and systems require lower capital investment, lower operating cost, and less physical space, thereby enabling implementation offshore and in remote locations, such as Arctic environments. The provided processes, apparatus, and systems provide the foregoing benefits while providing high hydrocarbon recovery as compared to conventional technology.

Additional embodiments are provided in the following Embodiments A-Q:

Embodiment A

An adsorbent bed system comprising:
a first adsorbent bed of adsorbent material capable of selectively removing a target gas from a gaseous mixture, which adsorbent bed is substantially cylindrical shape;
a second adsorbent bed of adsorbent material capable of selectively removing a target gas from a gaseous mixture, which second adsorbent bed has a substantially cylindrical shape (or other suitable geometric shape) and being disposed about the first bed of adsorbent material and is substantially the same cross-sectional area (e.g., face cross sectional area) as the cross-sectional area (e.g., face cross sectional area) of the first adsorbent bed.

Embodiment B

The adsorbent bed system of Embodiment A, further comprising:
a third adsorbent bed of adsorbent material capable of selectively removing a target gas from a gaseous mixture and being substantially cylindrical in shape and being disposed about the second adsorbent bed of adsorbent material, the third adsorbent bed of adsorbent material having approximately the same cross-sectional area (e.g., face cross sectional area) as the cross-sectional area of the first and second beds of adsorbent material (e.g., face cross sectional area).

Embodiment C

The adsorbent bed system of Embodiment B, further comprising:
one or more additional beds of adsorbent material which have selectivity to a target gas in a gaseous mixture and having a substantially cylinderical shape and being disposed about the third adsorbent bed of adsorbent material, the fourth adsorbent bed of adsorbent material having approximately the same cross-sectional area (e.g., face cross sectional area) as the cross-sectional area (e.g., face cross sectional area) of the first, second and third adsorbent beds of adsorbent material.

Embodiment D

The adsorbent bed system of any of Embodiments A-C, wherein the beds are connected at feed and product ends via rotary valving or non-rotary valving or a combination of these.

Embodiment E

The adsorbent bed system of any of Embodiments A-D, wherein the adsorbents are structured materials or combinations of structured materials and gas flow through the structured materials is substantially axial-flow.

Embodiment F

The adsorbent bed system of any of Embodiments A-D, wherein the adsorbents are non-structured materials or combinations of non-structured materials.

Embodiment G

The adsorbent bed system of Embodiment D, wherein the non-rotary valving comprises poppet valves, at least some of which share a common actuator.

Embodiment H

The adsorbent bed system of any of Embodiments A-G, which is assembled by introducing annular grooves into an adsorbent monolith and sliding annular rings of impermeable material into said grooves, said grooves running the length of the monolith material.

Embodiment I

The adsorbent bed system of Embodiment H, wherein the grooves are introduced using extrusion techniques or cutting techniques including lasers.

Embodiment J

The adsorbent bed system of any of Embodiments A-I, which is assembled by rolling/winding an adsorbent coated sheet on the outside of a cylinder containing a rolled adsorbent sheet of similar material as said adsorbent, and subsequently encasing said first rolled sheet in an annular cylinder of impermeable material,

Embodiment K

The adsorbent bed system of Embodiment J, wherein encasing also uses additional sealing and filling means.

Embodiment L

The adsorbent bed system of Embodiment J or K, wherein additional adsorbent sheets are successively wound and then encased to obtain multiple concentric vessels greater in number in than two.

Embodiment M

A method of processing hydrocarbons comprising the steps of:
(a) providing the adsorbent bed system of any of embodiments A-L or shown in the attached figures,
(b) recoverying at least 5 million, or at least 15 million, or at least 25 million, or at least 50 million, or at least 100 million, or at least 500 million, or at least 1 billion, or at least 2 billion standard cubic feet per day (SCFD) of natural gas.

Embodiment N

The method of Embodiment M, wherein one or more additional steps utilize a kinetic swing adsorption process selected from the group consisting of: pressure swing adsorption (PSA), thermal swing adsorption (TSA), calcination, partial pressure swing or displacement purge adsorption (PPSA), and combinations of these processes.

Embodiment O

The method of Embodiment N, wherein one or more swing adsorption process utilizes rapid cycles.

Embodiment P

The method of an of Embodiments M-O, wherein a gaseous feed stream is processed to achieve: (a) a desired dew point, (b) a desired level of detoxification, (c) a desired corrosion protection composition, (d) a desired dehydration level, (e) a desired gas heating value, (f) a desired purification level, or (g) combinations thereof.

Embodiment Q

A hydrocarbon treating apparatus comprising:
the adsorbent bed system of any of embodiments A-L or shown in the attached figures, wherein the hydrocarbon treating apparatus capacity is at least 5 million, or at least 15 million, or at least 25 million, or at least 50 million, or at least 100 million, or at least 500 million, or at least 1 billion, or at least 2 billion standard cubic feet per day (SCFD) of natural gas.

Embodiment R

The adsorbent bed system of any of the Embodiments A to Q, wherein the flow of streams through the first adsorbent bed and another adsorbent bed (e.g., the second, third or fourth bed) are configured to flow in opposite directions relative to each other.

In view of the many possible embodiments to which the principles of the disclosed invention may be applied, it should be recognized that the illustrative embodiments are only preferred examples of the invention and should not be taken as limiting the scope of the invention.

What is claimed is:
1. An adsorbent bed system comprising:
a first adsorbent bed of adsorbent material capable of selectively removing a target gas from a gaseous mixture, which adsorbent bed is substantially cylindrical shape;
a second adsorbent bed of adsorbent material capable of selectively removing a target gas from a gaseous mixture, which second adsorbent bed has a substantially cylindrical shape and being disposed about the first bed of adsorbent material and is substantially the same face cross-sectional area as the face cross-sectional area of the first adsorbent bed, wherein the first adsorbent bed and second adsorbent bed are separated by a material that is non-permeable to the gas flowing through the first adsorbent bed and the second adsorbent bed and the non-permeable material prevents leakage of gas between the first adsorbent bed and the second adsorbent bed; and
where the beds are connected at feed and product ends via non-rotary valving or and where the non-rotary valving comprises poppet valves, at least some of which share a common actuator.

2. The adsorbent bed system according to claim 1, further comprising:
a third adsorbent bed of adsorbent material capable of selectively removing a target gas from a gaseous mixture and being substantially annular in shape and being disposed about the second adsorbent bed of adsorbent material, the third adsorbent bed of adsorbent material having approximately the same face cross-sectional area as the face cross-sectional area of the first and second beds of adsorbent material.

3. The adsorbent bed system according to claim 2, further comprising:
a fourth adsorbent bed of adsorbent material which has selectivity to a target gas in a gaseous mixture and having a substantially cylindrical shape and being disposed about the third bed of adsorbent material, the fourth bed of adsorbent material having approximately the same face cross-sectional area as the face cross-sectional area of the first, second and third beds of adsorbent material.

4. The adsorbent bed system of claim 1 where the adsorbents are structured materials or combinations of structured materials and gas flow through the structured materials is substantially axial-flow.

5. The adsorbent bed system of claim 1 where the adsorbents are non-structured materials or combinations of non-structured materials.

6. The adsorbent bed system of claim 1 where the beds, valves and interconnections are used to deploy a swing adsorption process to separate components of a feed stream, such that at least one resultant product stream is enriched preferentially in one of the feed components.

7. The adsorbent bed system of claim 6 where the swing adsorption process is a fast cycled pressure swing adsorption process.

8. The adsorbent bed system of claim 6 where the swing adsorption process is a thermal swing process or a combination of thermal swing and pressure swing processes.

9. The adsorbent bed system of claim 1 which is assembled by introducing annular grooves into an adsorbent monolith and sliding annular rings of impermeable material into said grooves, said grooves running the length of the monolith material.

10. The adsorbent bed system of claim 9 where the grooves are introduced using extrusion techniques or cutting techniques including lasers.

11. The adsorbent system of claim 1 which is assembled by rolling/winding an adsorbent coated sheet on the outside of a cylinder containing a rolled adsorbent sheet of similar material as said adsorbent, and subsequently encasing said first rolled sheet in an annular cylinder of impermeable material.

12. The adsorbent bed system of claim 11 where encasing also uses additional sealing and filling means.

13. The adsorbent bed system of claim 11 where additional adsorbent sheets are successively wound and then encased to obtain multiple concentric vessels greater in number than two.

14. The adsorbent bed system of claim 1, wherein the flow of streams through the first adsorbent bed and the second adsorbent bed are configured to flow in opposite directions relative to each other.

15. An adsorbent bed system comprising:
a first adsorbent bed of adsorbent material capable of selectively removing a target gas from a gaseous mixture, which adsorbent bed is substantially cylindrical shape;
a second adsorbent bed of adsorbent material capable of selectively removing a target gas from a gaseous mixture, which second adsorbent bed has a substantially cylindrical shape and being disposed about the first bed of adsorbent material and is substantially the same face cross-sectional area as the face cross-sectional area of the first adsorbent bed, wherein the first adsorbent bed and second adsorbent bed are separated by a material that is non-permeable to the gas flowing through the first adsorbent bed and the second adsorbent bed and the non-permeable material prevents leakage of gas between the first adsorbent bed and the second adsorbent bed; and
which is assembled by introducing annular grooves into an adsorbent monolith and sliding annular rings of impermeable material into said grooves, said grooves running the length of the monolith material.

16. The adsorbent bed system according to claim 15, further comprising:
a third adsorbent bed of adsorbent material capable of selectively removing a target gas from a gaseous mixture and being substantially annular in shape and being disposed about the second adsorbent bed of adsorbent material, the third adsorbent bed of adsorbent material having approximately the same face cross-sectional area as the face cross-sectional area of the first and second beds of adsorbent material.

17. The adsorbent bed system according to claim 16, further comprising:
a fourth adsorbent bed of adsorbent material which has selectivity to a target gas in a gaseous mixture and having a substantially cylindrical shape and being disposed about the third bed of adsorbent material, the fourth bed of adsorbent material having approximately the same face cross-sectional area as the face cross-sectional area of the first, second and third beds of adsorbent material.

18. The adsorbent bed system according to claim 15 where the beds are connected at feed and product ends via rotary valving or non-rotary valving or a combination of these.

19. The adsorbent bed system of claim 18 where the adsorbents are structured materials or combinations of structured materials and gas flow through the structured materials is substantially axial-flow.

20. The adsorbent bed system of claim 18 where the adsorbents are non-structured materials or combinations of non-structured materials.

21. The adsorbent bed system of claim 18 where the beds, valves and interconnections are used to deploy a swing adsorption process to separate components of a feed stream, such that at least one resultant product stream is enriched preferentially in one of the feed components.

22. The adsorbent bed system of claim 21 where the swing adsorption process is a fast cycled pressure swing adsorption process.

23. The adsorbent bed system of claim 21 where the swing adsorption process is a thermal swing process or a combination of thermal swing and pressure swing processes.

24. The adsorbent bed system of claim 15 where the grooves are introduced using extrusion techniques or cutting techniques including lasers.

25. The adsorbent bed system of claim 15 wherein the flow of streams through the first adsorbent bed and the second adsorbent bed are configured to flow in opposite directions relative to each other.

26. An adsorbent bed system comprising:
a first adsorbent bed of adsorbent material capable of selectively removing a target gas from a gaseous mixture, which adsorbent bed is substantially cylindrical shape;
a second adsorbent bed of adsorbent material capable of selectively removing a target gas from a gaseous mixture, which second adsorbent bed has a substantially cylindrical shape and being disposed about the first bed of adsorbent material and is substantially the same face cross-sectional area as the face cross-sectional area of the first adsorbent bed, wherein the first adsorbent bed and second adsorbent bed are separated by a material that is non-permeable to the gas flowing through the first adsorbent bed and the second adsorbent bed and the non-permeable material prevents leakage of gas between the first adsorbent bed and the second adsorbent bed; and which is assembled by rolling/winding an adsorbent coated sheet on the outside of a cylinder containing a rolled adsorbent sheet of similar material as said adsorbent, and subsequently encasing said first rolled sheet in an annular cylinder of impermeable material.

27. The adsorbent bed system according to claim 26, further comprising:

a third adsorbent bed of adsorbent material capable of selectively removing a target gas from a gaseous mixture and being substantially annular in shape and being disposed about the second adsorbent bed of adsorbent material, the third adsorbent bed of adsorbent material having approximately the same face cross-sectional area as the face cross-sectional area of the first and second beds of adsorbent material.

28. The adsorbent bed system according to claim 27, further comprising:

a fourth adsorbent bed of adsorbent material which has selectivity to a target gas in a gaseous mixture and having a substantially cylindrical shape and being disposed about the third bed of adsorbent material, the fourth bed of adsorbent material having approximately the same face cross-sectional area as the face cross-sectional area of the first, second and third beds of adsorbent material.

29. The adsorbent bed system according to claim 26 where the beds are connected at feed and product ends via rotary valving or non-rotary valving or a combination of these.

30. The adsorbent bed system of claim 29 where the adsorbents are structured materials or combinations of structured materials and gas flow through the structured materials is substantially axial-flow.

31. The adsorbent bed system of claim 29 where the adsorbents are non-structured materials or combinations of non-structured materials.

32. The adsorbent bed system of claim 29 where the beds, valves and interconnections are used to deploy a swing adsorption process to separate components of a feed stream, such that at least one resultant product stream is enriched preferentially in one of the feed components.

33. The adsorbent bed system of claim 32 where the swing adsorption process is a fast cycled pressure swing adsorption process.

34. The adsorbent bed system of claim 32 where the swing adsorption process is a thermal swing process or a combination of thermal swing and pressure swing processes.

35. The adsorbent bed system of claim 26 where encasing also uses additional sealing and filling means.

36. The adsorbent bed system of claim 26 where additional adsorbent sheets are successively wound and then encased to obtain multiple concentric vessels greater in number than two.

37. The adsorbent bed system of claim 26 wherein the flow of streams through the first adsorbent bed and the second adsorbent bed are configured to flow in opposite directions relative to each other.

\* \* \* \* \*